No. 789,564. PATENTED MAY 9, 1905.
T. W. RANSON, Jr.
VEHICLE TIRE.
APPLICATION FILED JULY 30, 1904.
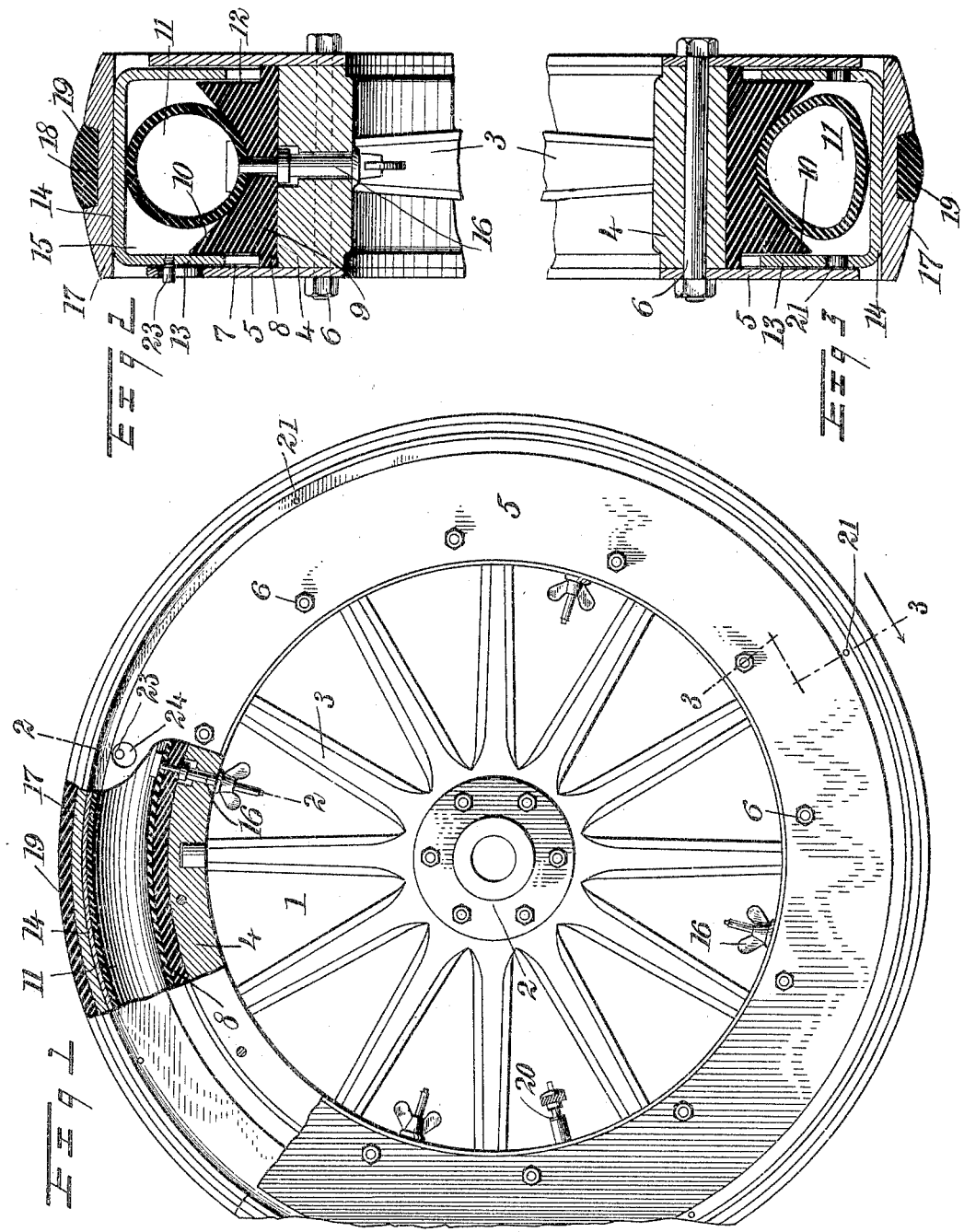
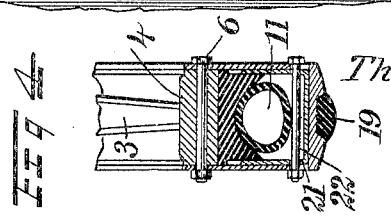
WITNESSES:
INVENTOR
Thomas W. Ranson Jr.
BY
ATTORNEYS No. 789,564.   Patented May 9, 1905.

UNITED STATES PATENT OFFICE.

THOMAS W. RANSON, JR., OF CLEVELAND, OHIO.

VEHICLE-TIRE.

SPECIFICATION forming part of Letters Patent No. 789,564, dated May 9, 1905.

Application filed July 30, 1904. Serial No. 218,778.

*To all whom it may concern:*

Be it known that I, THOMAS W. RANSON, Jr., a citizen of the United States, and a resident of the city of Cleveland, in the county of Cuyahoga and State of Ohio, have invented a new and Improved Vehicle-Tire, of which the following is a full, clear, and exact description.

My invention relates to tires for vehicles, and is especially applicable to the wheels of automobiles and similar vehicles.

The object of the invention is to produce a tire which is substantially protected from injury and which is at the same time possessed of considerable elasticity and flexibility.

A further object is to provide a construction which enables the wheel to substantially maintain its usual dimensions even though the tire should become flattened, it being understood that the invention is most useful in connection with pneumatic tires.

The invention consists of the construction and combination of parts, to be more fully described hereinafter and definitely set forth in the claims.

Reference is to be had to the accompanying drawings, forming a part of this specification, in which similar characters of reference indicate corresponding parts in all the views.

Figure 1 is a side elevation of a wheel to which my tire has been applied, the same being broken away at certain points to disclose the construction of the tire and the manner of attaching the same to the wheel. Fig. 2 is a transverse section through the rim of a wheel having a tire of my invention, the section being taken substantially on the line 2 2 of Fig. 1. Fig. 3 is a view similar to Fig. 2, but representing the tire somewhat distorted, as it would be when supporting the weight of the vehicle, the section being taken substantially on the line 3 3 of Fig. 1; and Fig. 4 is a section somewhat similar to Fig. 3, but upon a reduced scale, and representing the manner of applying certain bolts in case of an emergency in order to support the rim of the tire upon the wheel when the tire has become deflated.

Referring more particularly to the parts, 1 represents a wheel to which my tire has been applied, the said wheel comprising a hub 2 of any common construction, from which spokes 3 radiate, the same carrying a felly 4 in the usual manner. To the sides of this felly I attach annular disks or cheek-plates 5 by means of suitable bolts 6, and these cheek-plates project well beyond the outer face of the felly, so as to partially inclose the space 7, having substantially the form of a channel.

Between the cheek-plates 5 there is provided a tube-retainer, the same consisting, preferably, of an encircling band 8 of solid rubber, the inner face 9 whereof substantially fills the space between the inner faces of the cheek-plates, as illustrated. The outer face 10 of this retainer is substantially V-shaped in cross-section, the angle of the V being wide, as shown, in order to substantially support the pneumatic tube 11 in the manner shown most clearly in Figs. 2 and 3. The side faces of the tube-retainer are cut away, as shown, to form deep recesses 12. These recesses are occupied by the flanges 13, which project inwardly from the web or outer face 14 of the channel-rim 15, which preferably consists of steel. The outer sides of these flanges substantially rest against the inner faces of the cheek-plates 5, and the inner face of the web 14 normally rests tangentially upon the pneumatic tube 11, as indicated in Fig. 2. The pneumatic tube 11 and the tube-retainer 8 are suitably attached to the felly of the wheel by means of tire-bolts 16. Upon the outer face of the web 14 an encircling band 17 is placed, the same consisting, preferably, of steel and having a circumferential groove 18, the sides of which preferably diverge, as shown, the same receiving a protruding band 19, which constitutes a tread for the tire. This tread is preferably of rubber or some other elastic material.

The pneumatic tube 11 is designed to be filled with compressed air, for which purpose the same is provided with an inflating-nipple 20.

The members of the tire will normally assume the position in which they are represented in Fig. 2; but when the rim 17 of the tire is subjected to a considerable pressure, such as that which would occur from the weight of the vehicle, then the pneumatic tube will become compressed and distorted more or less into the form shown in Fig. 3, the rim 17 being then displaced upwardly and the flanges 13 of the rim passing more deeply into the recesses 12, as will be readily understood. If for any reason the pneumatic tube 11 should become incapacitated by reason of a puncture or the like, the rim 17 may still be supported upon the wheel in substantially its normal position, although its flexibility and much of its elasticity will be lost. To this end I provide a plurality of bolt-holes 21, preferably four in number, the same being located in the side flanges 13 of the channel-rim 15. In the event of the tube 11 becoming useless I would then apply bolts 22 in the openings 21 in the manner indicated in Fig. 4, the extremities of the said bolts projecting beyond the outer edges of the cheek-plates 5 in such a manner as to fix the channel-rim 15 upon the wheel. When this has been done, the elasticity of the tire will of course be sacrificed to a certain extent; but this is of little consequence in such an emergency as that suggested.

Where the wheel and tire are intact under ordinary circumstances it will be readily understood that the pneumatic tube 11 is very effectively shielded and inclosed by metal, so as to prevent likelihood of its being punctured. At the same time it gives the tire a very desirable resiliency not otherwise obtainable. The construction of the tire is also advantageous for another reason—namely, that in guiding the vehicle around sharp corners there is no possibility of the tire being thrown off in the well-known manner. This cannot occur, because the cheek-plates 5 operate effectively as guides for the channel-rim 15 and allow the same to move only in a plane at right angles to the axle of the wheel.

One of the flanges 13 of the channel-rim 15 is provided with a dowel-pin 23, which projects into an opening 24, formed at the proper point in the adjacent cheek-plate 5.

While the tire described is especially adapted for use with automobiles, no reason is seen why its application should be confined to this class of vehicles, and it is believed that the tire should be of general usefulness with all classes of vehicles.

Having thus described my invention, I claim as new and desire to secure by Letters Patent—

1. In combination, cheek-plates attached to the felly of a wheel and projecting therebeyond, a tube-retainer consisting of a band adapted to encircle the wheel, said band having recesses cut in the sides thereof adjacent to said cheek-plates, a channel-rim having inwardly-disposed flanges received in said recesses, and a pneumatic tube lying in said V-shaped groove and supporting said channel-rim.

2. A wheel having a body, a rim disposed thereabout and separated therefrom, and a pneumatic tire supporting said rim on said body, said wheel having means for attaching devices to support said rim independently of said tire.

3. In combination, a wheel having cheek-plates attached to the felly thereof and projecting therebeyond, a channel-rim having inwardly-disposed flanges lying in the space between said cheek-plates, a pneumatic tube within said channel-rim, said channel-rim having means for attaching removable members to support the same upon the edges of said cheek-plates.

4. In combination, a wheel, cheek-plates attached to the felly thereof and projecting therebeyond, a channel-rim having inwardly-disposed flanges abutting said cheek-plates, and a pneumatic tube adapted to support said channel-rim, said flanges having openings therethrough for attaching bolts therein.

In testimony whereof I have signed my name to this specification in the presence of two subscribing witnesses.

THOMAS W. RANSON, Jr.

Witnesses:
  THOMAS W. RANSON, Senr.,
  C. H. FATH.